Jan. 25, 1949.  L. J. WHITE  2,460,159
VAPOR OUTLET FOR TRUCK TANKS
Filed April 19, 1945

INVENTOR.
L. J. White.
BY
A. D. Adams
ATTORNEY.

Patented Jan. 25, 1949

2,460,159

UNITED STATES PATENT OFFICE 2,460,159

VAPOR OUTLET FOR TRUCK TANKS

Loyd J. White, San Antonio, Tex., assignor to Southern Steel Company, San Antonio, Tex., a corporation of Texas Application April 19, 1945, Serial No. 589,256

4 Claims. (Cl. 62—1)

This invention relates to truck tanks for transporting liquefied petroleum gases such as butane and propane, or commercial mixtures thereof, and, among other objects, aims to provide an improved pressure relief outlet for the vapor which will function when the truck turns over or falls on its side, due to an accident. The main idea is to provide a movable vapor outlet within the tank, which will automatically adjust itself so that it will communicate with the vapor space above the liquid level when the tank turns over or the truck falls over on its side.

Other aims and advantages of the invention will appear in the specification when considered in connection with the accompanying drawing, wherein.

Figure 1:
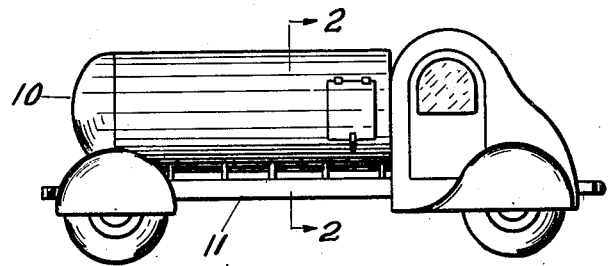
Fig. 1 is a more or less diagrammatic illustration of a service truck embodying the invention.
Figure 2:
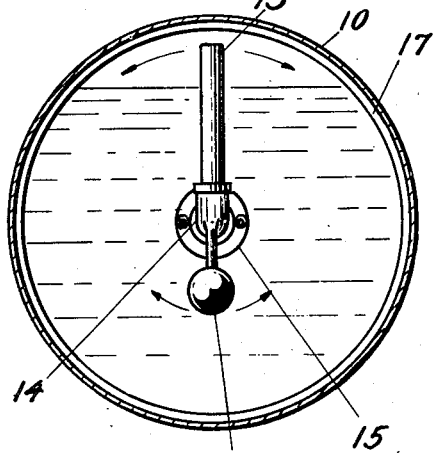
Fig. 2 is a sectional view taken on the line 2—2 of Fig. 1.
Figure 3:
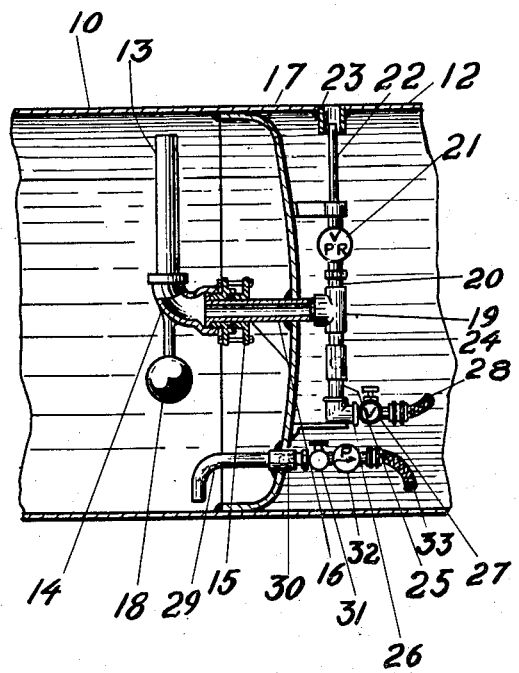
Fig. 3 is a fragmentary longitudinal sectional view, parts being shown in elevation.

Referring, generally, to the drawing, the illustrated embodiment of the invention is contrived to insure adequate relief of pressure in a service truck tank in case of an accident. It is required that such tanks shall have provision for relief of pressure under all ordinary operating conditions. Consequently, relief valves for this purpose are designed to prevent excessive vapor pressures, even though the truck may be exposed to fire which might result from an accident. In the ordinary service truck tank, no provision is made for venting vapor in case the truck turns on its side or rolls over. In other words, the vapor conduit leading to the relief valve would be submerged under liquid and the capacity of the valve in that event is not sufficient to drain the liquid contents of the tank fast enough to relieve the tank of dangerous pressures in case of a fire. Accordingly, it is the primary aim of this invention to provide a vapor outlet for service truck tanks which automatically moves or swings into the vapor space of the tank when it turns on its side or rolls over, due to an accident, thereby insuring continuous discharge of vapor instead of liquid, through the pressure relief valve.

Referring particularly to the drawing, the improved vapor outlet is shown as being embodied in a service truck tank 10 mounted on a chassis frame 11, which may be, and preferably is, similar to the service truck shown in my co-pending application, filed of even date herewith, Ser. No. 589,255. As disclosed in said co-pending application, the tank shell is extended to provide a housing portion 12 within which are mounted all of the safety and servicing appurtenances and connections, so that they cannot be easily damaged or broken off in case of an accident. Inasmuch as this invention has to do solely with the vapor outlet connection, a showing of some of the appurtenances is omitted.

In this instance, the vapor outlet is shown as comprising a vertical pipe or conduit 13 connected by an elbow fitting 14 and a swing joint 15 to a fixed horizontal conduit 16 extending through the front head 17 of the tank. The arrangement is such that the vertical conduit 13 can swing in a vertical plane around the inner end of the vapor outlet conduit portion 16 and the elbow is shown as carrying a counterweight 18 having sufficient mass to insure that the pipe 13 will always swing to and remain in a substantially vertical position.

The outlet conduit section 16 is shown as having a T fitting 19 at its forward end and to the upper branch an outlet pipe 20 is connected. This pipe carries an ordinary pressure relief valve 21. The upper end portion 22 is shown as terminating within an inwardly extending cylindrical nipple 23 in the shell of the housing extension 12, so that it is protected thereby and cannot easily be broken off when the shell is bent. The lower branch of the fitting 19 is shown as having a vapor return conduit 24 connected thereto and it carries an excess flow check valve 25 which closes downwardly when there occurs an excessive flow of vapor, as in case of a broken hose. The lower end of the vapor return conduit is shown as carrying an elbow fitting 26 to which is connected a hand valve 27 and an ordinary vapor hose 28.

The truck tank also has an ordinary service filling conduit 29, an outwardly closing excess flow check valve 30, and a manual cut-off valve 31 leading to a pump 32 and service or filling hose 33. Both the filling and vapor return hoses are designed to be connected to the fittings on a system of the general type shown in my Patents Nos. 2,121,673; 2,121,675, and 2,176,829. When the vapor return hose is first connected to such a system and the pressure in the service tank gradually exceeds that in the underground tank, it will be understood that the vapor will flow out of the tank into the underground tank to equalize the pressures in the underground tank and the service tank. Then, the pump 32 will deliver liquefied gas from the truck tank to the consumer's system.

From the foregoing description, it will be understood that the vapor outlet insures the relief of vapor pressure in the tank after the truck falls on its side or overturns. It is also effective to insure adequate relief, even in case of fire. Therefore, it promotes safer transportation of highly volatile fuels which present many hazards.

Obviously, the present invention is not restricted to the particular embodiment thereof herein shown and described; but the apparatus is capable of various modifications within the scope of the appended claims.

What is claimed is:

1. In a service truck tank for transporting liquefied petroleum gas, a vapor relief outlet connected to one end of the tank including a shiftable conduit section within the tank communicating with the vapor space therein and a fixed conduit portion outside the tank carrying a pressure relief valve; and means connected to said shiftable conduit section positioned to shift it automatically as the liquid level is shifted when the truck falls on one side or turns over, and thereby maintain communication with the shifted vapor space.

2. In a service truck tank for transporting liquefied petroleum gas, a vapor relief outlet including a swingable conduit section within the tank and a fixed conduit portion outside the tank carrying a pressure relief valve; and gravity means connected to the swingable conduit to swing it into the vapor space when the truck falls on one side or turns over.

3. In a service truck tank for transporting liquefied petroleum gas, a vapor conduit connected to one end of the tank and having a pressure relief valve and a service branch, said vapor conduit having a swinging pipe section within the tank; and a counterweight on the swinging pipe section arranged to swing it into the shifted vapor space when the truck falls on one side.

4. In combination with a service truck for transporting liquefied petroleum gas having a cylindrical tank and a protecting housing at the forward end of the tank, a vapor relief conduit connected to the forward end of the tank at the center of the head and projecting into said housing, said conduit having a swingable pipe section mounted within the tank to swing in a plane transversely of the axis of the tank; and a counterweight connected to the swingable pipe section to shift it into the vapor space automatically when the truck falls on its side or overturns.

LOYD J. WHITE.

REFERENCES CITED

The following references are of record in the file of this patent:

UNITED STATES PATENTS

| Number | Name | Date |
|---|---|---|
| 1,897,164 | Endacott | Feb. 14, 1933 |
| 2,379,579 | Hunter | July 23, 1945 |